United States Patent
Williams

(10) Patent No.: US 7,858,910 B2
(45) Date of Patent: Dec. 28, 2010

(54) ZERO BLIND ZONE DOPPLER BEAM SHARPENING

(75) Inventor: Brett A Williams, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1593 days.

(21) Appl. No.: 10/943,750

(22) Filed: Sep. 17, 2004

(65) Prior Publication Data

US 2006/0060761 A1 Mar. 23, 2006

(51) Int. Cl.
- *F42B 15/01* (2006.01)
- *G01S 7/40* (2006.01)
- *G01S 7/483* (2006.01)
- *F42B 15/00* (2006.01)
- *F41G 7/00* (2006.01)

(52) U.S. Cl. .................. 244/3.16; 244/3.1; 244/3.15; 244/3.19; 342/61; 342/62; 342/118; 342/134; 342/165; 342/173; 342/175; 342/195

(58) Field of Classification Search ........... 244/3.1–3.3; 343/872, 873; 89/1.11; 342/61–68, 25 R–25 F, 342/118, 134–147, 165, 173–175, 192–197
See application file for complete search history.

(56) References Cited

U.S. PATENT DOCUMENTS

| | | | | |
|---|---|---|---|---|
| 4,008,869 A | * | 2/1977 | Weiss | ............. 244/3.13 |
| 4,173,414 A | * | 11/1979 | Vauchy et al. | ............. 244/3.16 |
| 4,303,211 A | * | 12/1981 | Dooley et al. | ............. 244/3.19 |
| 4,306,691 A | * | 12/1981 | Boxenhorn et al. | ............. 244/3.18 |
| 4,359,732 A | | 11/1982 | Martin | |
| 4,387,373 A | | 6/1983 | Longuemare, Jr. | |
| 4,773,754 A | * | 9/1988 | Eisele | ............. 244/3.13 |
| 4,851,848 A | | 7/1989 | Wehner | |
| 5,149,011 A | * | 9/1992 | Gratt et al. | ............. 244/3.19 |
| 5,192,208 A | | 3/1993 | Ferguson et al. | |
| 5,368,254 A | * | 11/1994 | Wickholm | ............. 244/3.16 |
| 5,442,364 A | | 8/1995 | Lee et al. | ............. 342/372 |
| 5,469,167 A | | 11/1995 | Polge et al. | |
| 5,526,181 A | * | 6/1996 | Kunick et al. | ............. 244/3.16 |
| 5,726,657 A | | 3/1998 | Pergande et al. | ............. 342/202 |
| 5,799,899 A | * | 9/1998 | Wells et al. | ............. 244/3.11 |
| 5,847,673 A | | 12/1998 | Bell | |
| 5,944,281 A | | 8/1999 | Pittman et al. | ............. 244/3.12 |
| 6,028,712 A | * | 2/2000 | McKenney et al. | ............. 244/3.17 |
| 6,114,984 A | | 9/2000 | McNiff | ............. 342/62 |
| 6,201,230 B1 | * | 3/2001 | Crowther et al. | ............. 244/3.16 |

(Continued)

*Primary Examiner*—Bernarr E Gregory
(74) *Attorney, Agent, or Firm*—Williams, Morgan & Amerson PC

(57) ABSTRACT

A method and apparatus for remotely sensing the content in a field of view are disclosed. The method includes transmitting a coherent optical signal into a field of view; receiving and detecting a reflection of the optical signal from a portion of the field of view bounded by the platform's boresight; correcting the first instance of the detected reflection; and resolving the content of a plurality of cells in the field of view up to the platform's boresight. The apparatus comprises a radome; an optical signal generator; an optical transmission channel; an optical receiver channel; and a plurality of electronics capable of receiving the representative signal and: correcting the first instance of the detected reflection; and resolving the content of a plurality of cells in the field of view up to the boresight from the corrected first instance of the reflection.

43 Claims, 12 Drawing Sheets

U.S. PATENT DOCUMENTS

| | | | |
|---|---|---|---|
| 6,310,730 B1 * | 10/2001 | Knapp et al. | 244/3.17 |
| 6,313,951 B1 * | 11/2001 | Manhart et al. | 244/3.17 |
| 6,356,396 B1 * | 3/2002 | Chen et al. | 244/3.17 |
| 6,462,889 B1 * | 10/2002 | Jackson | 244/3.17 |
| 6,484,966 B1 * | 11/2002 | Steiner et al. | 244/3.11 |
| 6,542,110 B1 | 4/2003 | Löhner et al. | |
| 6,650,274 B1 | 11/2003 | Krikorian et al. | |
| 6,674,391 B2 | 1/2004 | Ruszkowski, Jr. | |
| 6,851,645 B1 * | 2/2005 | Williams et al. | 244/3.16 |
| 6,871,817 B1 * | 3/2005 | Knapp | 244/3.16 |
| 2003/0210168 A1 | 11/2003 | Ruszkowski, Jr. | |

* cited by examiner

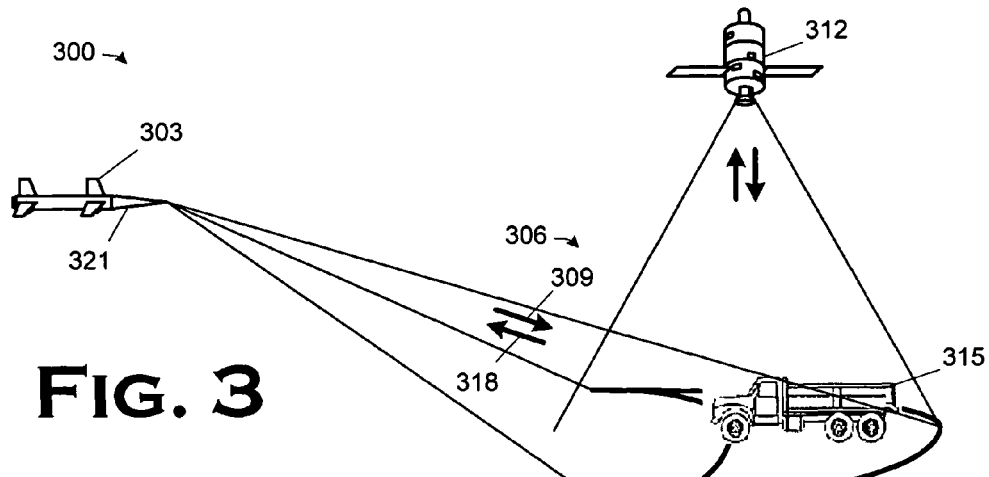
FIG. 3
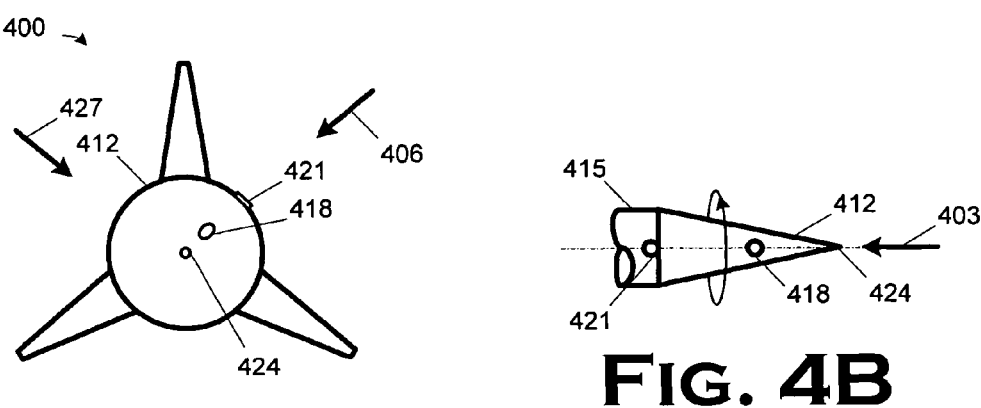
FIG. 4A
FIG. 4B
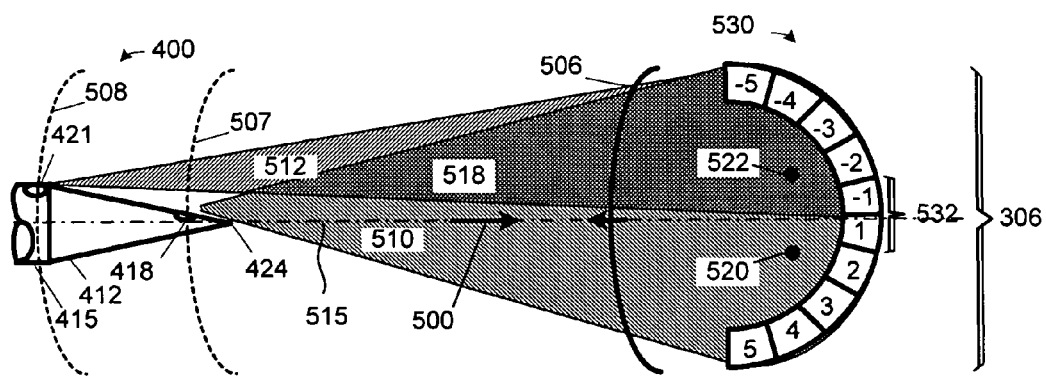
FIG. 5

RADIANS OFF BORESIGHT

FIG. 12A  FIG. 12B

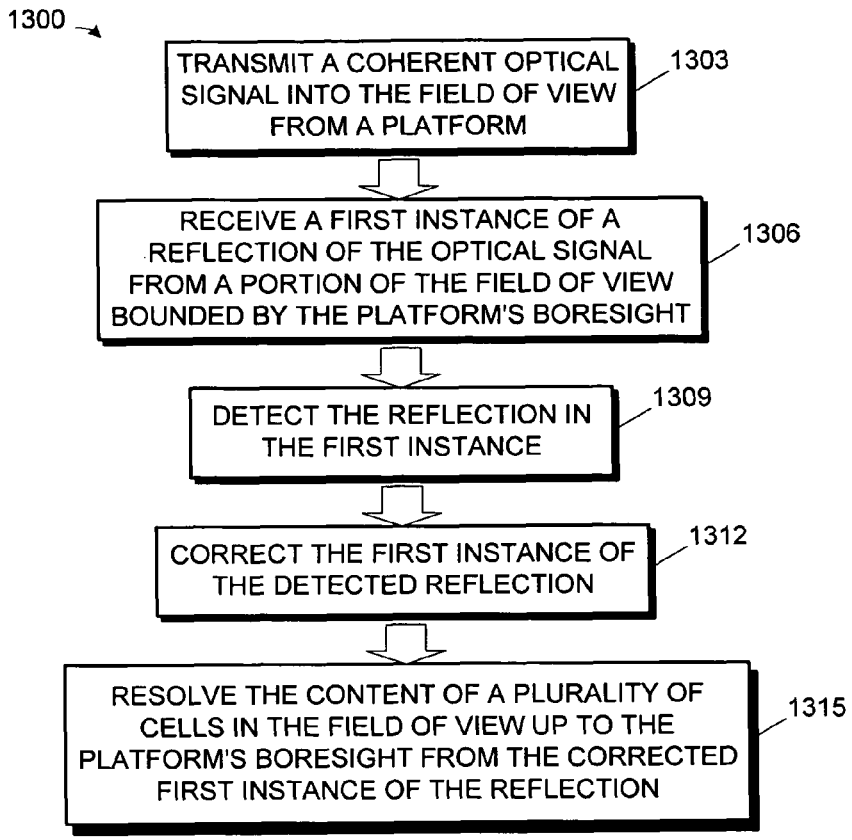
FIG. 13
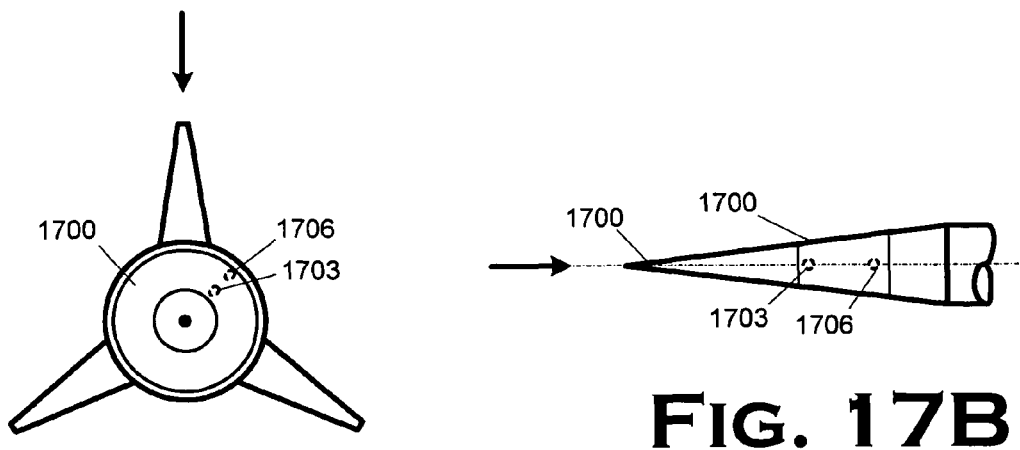
FIG. 17A
FIG. 17B

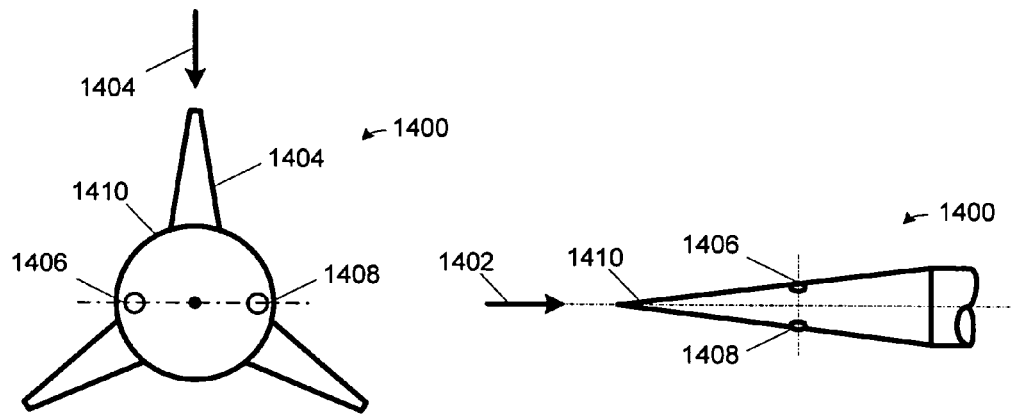
FIG. 14A
FIG. 14B
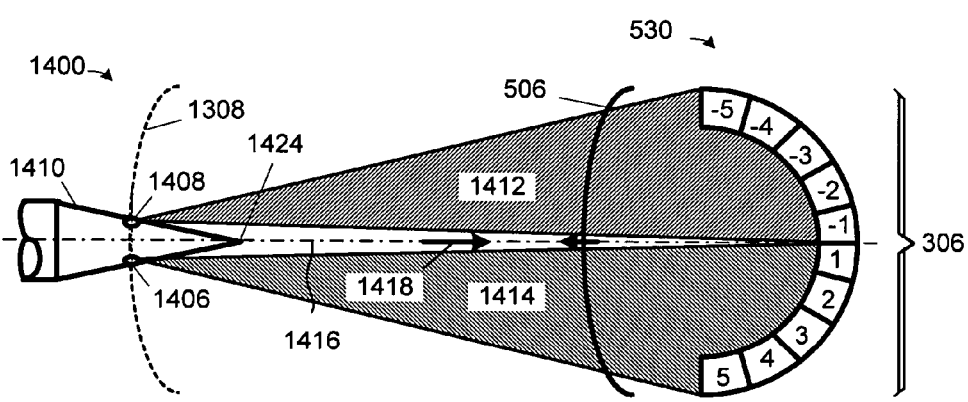
FIG. 14C
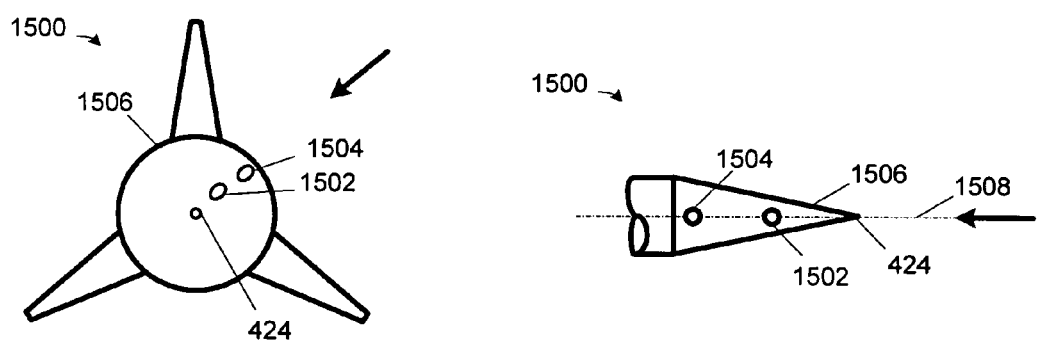
FIG. 15A
FIG. 15B

ZERO BLIND ZONE DOPPLER BEAM SHARPENING

BACKGROUND OF THE INVENTION

1. Field of the Invention

The present invention pertains to remote sensing, and, more particularly, to a Doppler beam sharpening technique for use in a remote sensing system.

2. Description of the Related Art

A significant need in many contexts is to locate and determine the position of things relative to some point. For instance, in a military context, it may be desirable to determine the position or to locate an object relative to a reconnaissance or weapons system so that the object may be targeted. In World War II, the British developed and utilized radio detection and ranging ("RADAR") systems for remotely sensing the relative position of incoming planes of the German Luftwaffe. RADAR uses radio frequency ("RF") electromagnetic waves to detect and locate objects at great distances even in bad weather or in total darkness. More particularly, a RADAR system broadcasts RF waves into a field of view, and objects in the field of view reflect the RF waves back to the RADAR system. The characteristics of the reflected waves (i.e., amplitude, phase, etc.) can then be interpreted to determine the position of the object that reflected the RF wave.

Some RADAR systems employ a technique known as "Doppler beam sharpening" ("DBS"). DBS uses the motion of an airborne RADAR to induce different Doppler shifted reflections from different cells on the ground. For a fixed range the cells have different Doppler frequencies because each is at a different angle relative to the source of the RADAR wave. This angle comprises depression and azimuth components in rectangular coordinates or, in polar coordinates, a "look angle." Thus, projections of the RADAR's velocity on each cell differ, thereby allowing for discrimination of each from the other. Azimuth resolution comes from the Doppler frequency, while range is retrieved from pulse delay. Azimuth resolution is related to Doppler filter bandwidth which is inversely related to the integration time of that filter—the aperture time.

Consider, for instance, the scenario 100 depicted in FIG. 1. A platform 103 is traveling in a direction defined by the vector V defined in an X-Y-Z Cartesian coordinate system. The platform 103 may be an airborne vehicle, such as an aircraft, a reconnaissance drone, a missile, or a guided submunition, or may be a spacecraft, such as an orbiting satellite. The platform 103 is equipped and is using a conventional DBS RADAR system transmitting, e.g., RF waves 106-109, into a field of view. The field of view is, in this particular scenario, a cone defined by the platform 103 and the footprint 112. The footprint 112 may be, for instance, an area on the ground painted by the RF waves transmitted by the DBS RADAR system. For ease of illustration, the footprint 112 is shown in the X-Y plane of the Cartesian coordinate system. The vector V' is a projection of the vector V onto the X-Y plane.

The footprint 112 comprises a number of cells, or subareas, such as the cells 115-118. Each of the cells 115-118 is at least a slightly different distance from the platform 103, i.e., their ranges from the platform 103 vary. Each of the look angles $\theta_1$-$\theta_4$ for the waves 106-109 relative to the direction of travel V is also at least slightly different. The characteristics of the reflections of the waves 106-109 are products of these two facts. For instance, the travel time from the platform 103 to the cells generates a "pulse delay" in the reflection relative to the respective wave 106-109 of which it is a reflection. Thus, the magnitudes of the pulse delays are a measure of the range to the cells 115-118. The look angles $\theta_1$-$\theta_4$ impart what is known as a "Doppler shift" into the frequency of the reflection, the amount of the Doppler shift being a function of the magnitude of the angle.

The DBS RADAR system, upon receipt of the reflections, then processes the reflections to extract information such as the pulse delay and Doppler shift that they contain. From this information, the DBS RADAR system can generate an "image" of the footprint 112. The image is a data set representative of the content of the footprint 112. The pulse delay provides resolution, or detail, about the content of the footprint 112 for this image in range. The Doppler shift provides resolution in azimuth. The magnitude of reflected signal from each ground cell is proportional to a pixel grayscale value in the resulting image. FIG. 2 is a highly stylized depiction of a visual display 200 of such an image, including a land mass 203 and a body of water 206.

However, DBS RADAR systems have range dependent resolution and a blind zone dead ahead of the DBS RADAR's motion. A blind zone 209, centered on a boresight 212, is shown in FIG. 2. The blind zone 209 pictured might be a meter across or a mile. The magnitude is unknown as there is no range reference in the drawing. The blind zone 209 results because, ahead of the platform 103, there are insufficient differences in the Doppler shift generated by the cells for the DBS RADAR system to distinguish them. More technically, DBS RADARs have problems pulling cells out of fields of view directly ahead of flight because, for a given resolution, any separation between adjacent iso-Doppler curves becomes too narrow. That is, the iso-Doppler contours get too close together for a fixed resolution and to resolve them requires ever-narrower filters compared to broadside ground-cells.

The reflections sometimes present what are known as "Doppler ambiguities" in the filed of view where the field of view encompasses both sides of the boresight. The ambiguities arise because not only are the iso-Doppler contours too close together, cells close to the boresight and the same distance off the boresight will have the same returns. That is, close to the boresight, the returns from cells equidistant from the boresight are indistinguishable. This causes ambiguities during processing because it cannot be determined from which side of the boresight a return came.

The present invention is directed to resolving, or at least reducing, one or all of the problems mentioned above.

SUMMARY OF THE INVENTION

The invention includes, in its various embodiments and implementations, a method and apparatus for remotely sensing the content in a field of view. The method comprises transmitting a coherent optical signal into the field of view from a platform; receiving a first instance of a reflection of the optical signal from a portion of the field of view bounded by the platform's boresight; detecting the reflection in the first instance; correcting the first instance of the detected reflection; and resolving the content of a plurality of cells in the field of view up to the platform's boresight from the corrected first instance of the reflection. The apparatus comprises a radome; an optical signal generator capable of generating an optical signal when fired; an optical transmission channel for the optical signal through the radome, the optical transmission channel defining a boresight for the apparatus; an optical receiver channel through which a first instance of a reflection of the optical signal may be received, the sensed portion of the field of view for the optical receiver channel being bound by the boresight and outputting a signal representative of the first instance of the reflection; and a plurality of electronics capable of receiving the representative signal and: correcting the first instance of the detected reflection; and resolving the content of a plurality of cells in the field of view up to the boresight from the corrected first instance of the reflection.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one particular scenario in which a platform may employ the present invention to resolve Doppler ambiguities in the remote sensing of a field of view in accordance with the present invention;

FIG. 4A-FIG. 4B depict one particular embodiment of the forward end of the platform of FIG. 3;

FIG. 5 illustrates the operation the platform of FIG. 1 in the scenario illustrated therein using the forward end illustrated in FIG. 4A-FIG. 4B;

FIG. 12A-FIG. 12C depict an embodiment alternative to that in FIG. 4A-FIG. 4B in which the invention is implemented with a single optical channel;

FIG. 13 illustrates a method in accordance with the embodiment of FIG. 12A-FIG. 12B;

FIG. 14A-FIG. 14C depict another embodiment employing two optical channels, one on each side of a radome, to implement the present invention;

FIG. 15A-FIG. 15B depict another invention in which multiple, longitudinally aligned optical channels are situated on the radome of the platform;

FIG. 17A-FIG. 17B depict another embodiment in which the windows of the optical channels are implemented in a collar about the radome.

Figure 1:
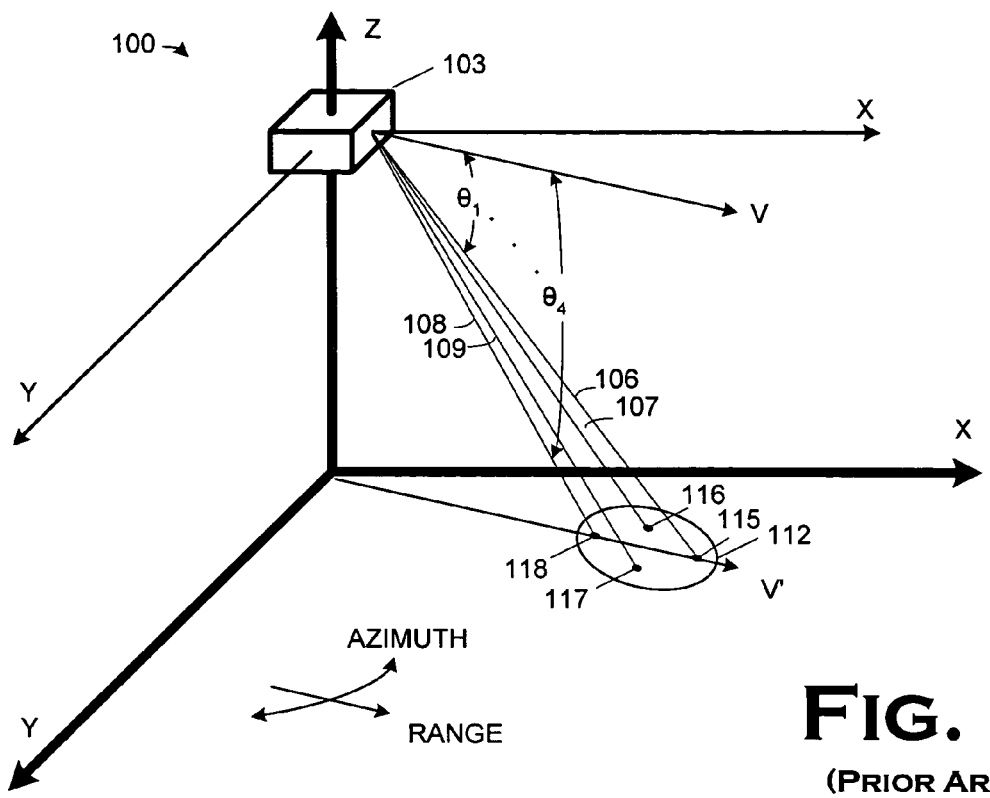
FIG. 1 illustrates the operational principles of a conventional Doppler beam sharpening system.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 3 illustrates a scenario 300 in which a platform 303 paints a field of view 306 with an optical signal, as represented by the arrow 309. Note that the platform 303 in the illustrated embodiment is a missile, but it may be implemented in any airborne or space-based platform. For example, some alternative embodiments may employ a satellite 312 as a platform from which the invention may be implemented. Various features within the field of view 306, e.g., the truck 315, reflect the optical signal, as represented by the arrow 318, to the platform 303. The platform 303 then receives the reflected signal, as indicated by the arrow 318, and processes it to remove the Doppler ambiguities therein in accordance with the present invention.

More particularly, FIG. 4A-FIG. 4B depict one particular embodiment 400 of the forward end 321 of the platform 303. FIG. 4A is a plan, head-on view of the embodiment 400 from the perspective of the arrow 403 in FIG. 4B. FIG. 4B is a plan, side view of the embodiment 400 from the perspective of the arrow 406 in FIG. 4A. The embodiment 400 includes a radome 412 affixed to the fuselage 415 of the platform 303. The embodiment 400 also includes two optical channels 418, 421 through which the embodiment 400 receives the reflected signal. The optical channel 418 is situated on the radome 412 and the optical channel 421 is situated on the fuselage 415. For the sake of illustration, the optical channel 421 is shown in FIG. 4B as elevating slightly from the surface of the fuselage 415. Some embodiments may choose to do this for a variety of reasons that will become clear below. However, as those skilled in the art having the benefit of this disclosure will appreciate, it will typically be desirable in this particular embodiment to mount the optical channel 421 so that it is flush with the surface of the fuselage 415. The embodiment 400 also includes an aperture 424 through which an on-board signal generator (not shown) may transmit the optical signal.

Referring now to FIG. 5, the embodiment 400 first shown in FIG. 4A-FIG. 4B is shown from the perspective of the arrow 427 in FIG. 4A. The platform 300 generates and transmits a coherent optical signal 500 into the field of view 306. The optical signal 500 may be in any of several bands, including—but not limited to—the visible, ultraviolet ("UV"), near infrared ("NIR"), medium-wavelength infrared ("MWIR") and long-wavelength infrared ("LWIR") bands. In the illustrated embodiment, the optical signal 500 is a split-beam, pulsed laser signal. However, in embodiments employing laser signals, the signal need not necessarily be pulsed or split-beam.

The optical signal 500 is reflected by features within the field of view 306 as was generally described relative to FIG. 3. The reflection 506 in FIG. 5 results from the reflection of the optical signal 500. As the reflection 506 passes over the platform 303, the forward optical channel 418 will receive and detect the reflection 506 first, i.e., in the first instance 507, by virtue of its forward position. As the reflection 506 continues passing over the platform 303, the aft optical channel 421 will subsequently receive and detect the reflection 506, i.e., in the second instance 508.

By virtue of its position and design, the forward optical channel 418 senses a first portion 510 of the field of view 306 while the aft optical channel 421 senses a second portion 512. In the illustrated embodiment, the first portion 510 is coextensive with the entire field of view 306. Note that the first portion 510 extends past the boresight 515, defined for the platform 303 by the path of propagation for the optical signal 500 as it leaves the platform 303.

The second portion 512, however, is bound by the boresight 515. In the illustrated embodiment, this is a function of the position of the aft optical channel 421. The second portion 512 is restricted because the aft optical channel 421 is located on a portion of the platform 303 that is not raked, or is only slightly raked, relative to the line of travel for the reflection 506. As will be apparent from the discussion below, an unraked or slightly raked detection will suffer more signal loss during detection than does the highly raked detection, but the increased signal loss still leaves sufficient signal for the practice of the invention. Nevertheless, the angle of incidence when the reflection 506 passes over the aft optical channel 421 is insufficient for those portions of the reflections 506 originating on the far side of the boresight 515 to be received and detected.

Note that, because the first portion 510 sensed by the forward optical channel 418 covers the entire field of view 306, there is a significant overlap 518 between the first and second portions 510, 512. The overlap 518 will be, at the point of reflection, such that the first portion 510 will wholly subsume the second portion 512 since the first portion 510 will be co-extensive with the entire field of view 306. Note also that, because the first portion 510 extends on both sides of the boresight 515, the problem of equi-Doppler shifts leading to Doppler ambiguities will arise once again in the first instance 507. However, the present invention employs the overlap 518 to resolve these Doppler ambiguities.

Consider the points 520, 522, which are equidistant from the boresight 515 in azimuth. The forward optical channel 418 can sense both points 520, 522 because they are both within its field of view (i.e., the first portion 510). However, the forward optical channel 418 cannot discriminate between the two because of the Doppler ambiguity they present. However, the aft optical channel 421 can only sense the point 522 and, since its field of view (i.e., the second portion 512) is bound by the boresight 515, the returns it senses (i.e., the second instance 508) contain no Doppler ambiguities. Thus, the returns sensed by the aft optical channel 421 can be used to correct for Doppler ambiguities and fill in the DBS blind zone 532 around the boresight 515.

Figure 6:
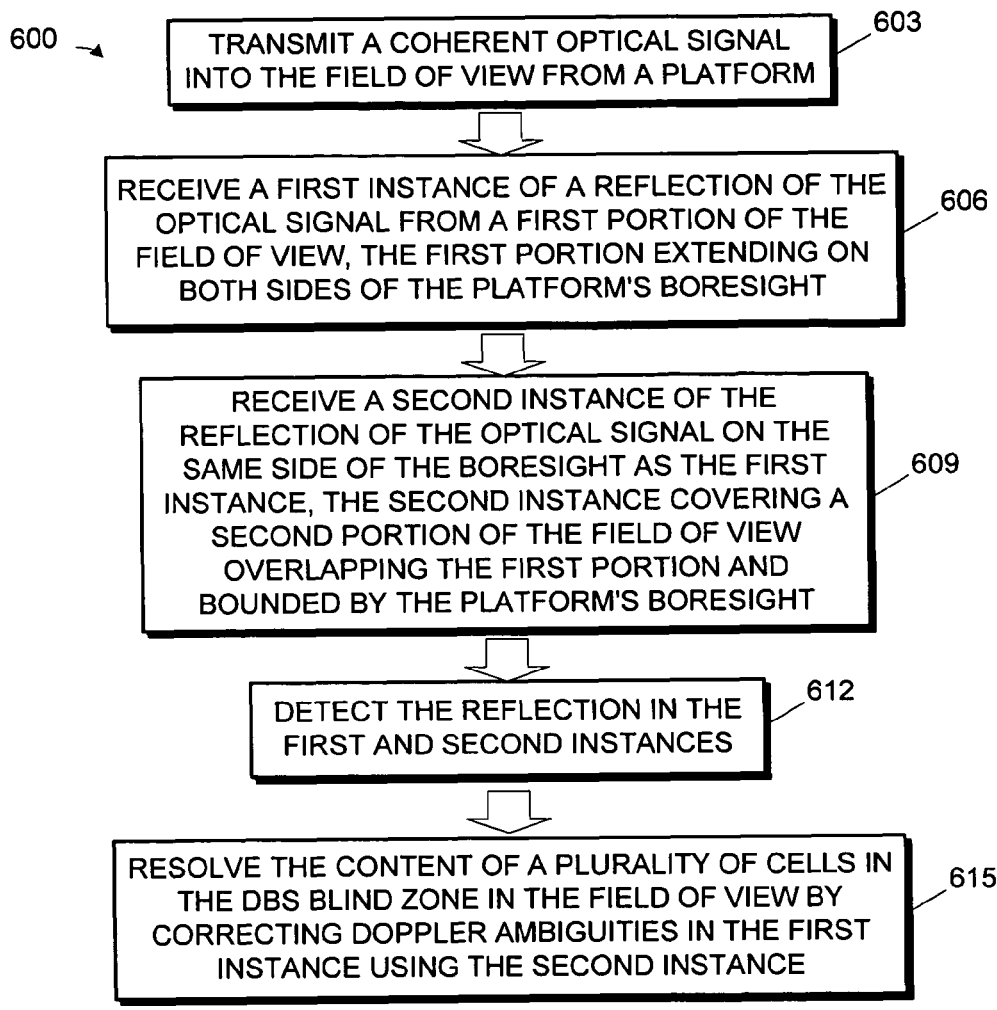
FIG. 6 conceptually presents a method for remotely sensing the content in a field of view in accordance with one particular embodiment of the present invention.

Thus, referring to FIG. 5-FIG. 6, the present invention, in one aspect, includes a method 600, shown in FIG. 6, for remotely sensing the content in a field of view 306, shown in FIG. 5, that resolves the content of a plurality of cells 530 in the field of view 306. This resolution includes the resolution of the cells 530 in the DBS blind zone 532. For illustrative purposes, this scenario shall consider the cells 530 that are ±1 cell off the boresight as the blind zone 532. The method 600 comprises:

transmitting (at 603) the coherent optical signal 500 into the field of view 306 from the platform 303;

receiving (at 606) a first instance 507 of a reflection 506 of the optical signal 500 from a first portion 510 of the field of view 306, the first portion 510 extending on both sides of the platform 303's boresight 515;

receiving (at 609) a second instance 508 of the reflection 506 of the optical signal 500 on the same side of the boresight 515 as the first instance 507, the second instance 508 covering a second portion 512 of the field of view 306 overlapping the first portion 510 and bounded by the platform 303's boresight 515;

detecting (at 612) the reflection 506 in the first and second instances 507, 508; and resolving (at 615) the content of a plurality of cells 530 in the DBS blind zone 532 (e.g., ±1 cell 530 off the boresight 515) in the field of view 306 by correcting Doppler ambiguities in the first instance 506 using the second instance 507.

Figure 7:
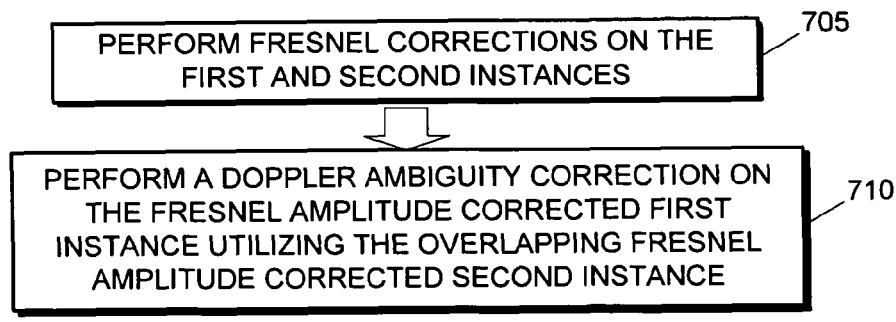
FIG. 7 conceptually presents a technique for resolving the content of cells in the DBS blind zone in the embodiment of FIG. 6.

Note that, in the illustrated embodiment, the detecting (at 612) is range-gated, a technique commonly used in LADAR systems and so not discussed further herein. Note also that this range-gating performs a sampling function in detecting the reflection 506. In the illustrated embodiment, resolving (at 615) the content of the cells 530 in the DBS blind zone 532 includes, as is shown in FIG. 7:

performing (at 705) Fresnel corrections on the first and second instances 507, 508; and performing (at 710) a Doppler ambiguity correction on the Fresnel amplitude corrected first instance 507 utilizing the overlapping Fresnel amplitude corrected second instance 508.

These two corrections, as implemented in the illustrated embodiment, will now be discussed in turn.

Figure 8A:
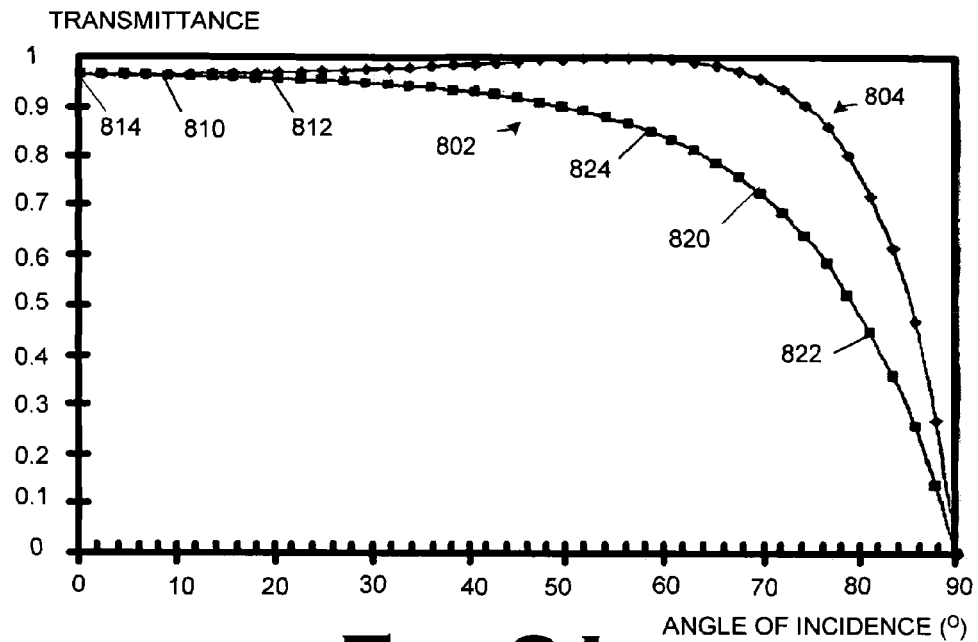
FIG. 8A-FIG. 8B illustrate the relationship between angle of incidence and transmission of radiation impinging on the windows of an optical channel in a radome of the present invention.

The illustrated embodiment takes advantage of a phenomenon quantified by Augustin Fresnel (1788-1727) that allows the angle of incidence of the reflection 506 on the optical channels 418, 421 to be derived as a function of the amplitude of the detected signal. As seen in FIG. 8A, the transmittance of radiation through an air/fused silica interface is a strong function of both incidence angle and polarization based upon Fresnel's equations:

$$t_s = 2n_i \cos(\theta_i)/[n_i \cos(\theta_i) + n_t \cos(\theta_t)], \text{ and} \quad \text{Eq. 1}$$

$$t_p = 2n_i \cos(\theta_i)/[n_i \cos(\theta_t) + n_t \cos(\theta_i)]. \quad \text{Eq. 2}$$

In Fresnel's equations Eq. 1 and Eq. 2, $t_s$ corresponds to the transmittance for S-polarized (perpendicular) radiation and $t_p$ corresponds to the transmittance for P-polarized (parallel) radiation. $\theta_i$ and $\theta_t$ correspond to the angles of incidence and transmission, respectively. Lastly, $n_i$ and $n_t$ correspond to the indices of refraction for the incident and transmitted materials, respectively. This dependence of the transmittance upon the angle of incidence shall be defined as Fresnel transmittance.

Curve 802 approximates the Fresnel transmittance $t_s$ for radiation incident upon the air/fused silica interface, while curve 804 approximates the Fresnel transmittance $t_p$. At small incident angles, such as point 810 at 10°, corresponding to a blunt or hemispherical radome, Fresnel transmittance is not a strong function of angle at all. More specifically, for an incident angle of 10°, radiation received within an angle of +10° (point 812) to −10° (point 814) shows virtually no difference in Fresnel transmittance, regardless of polarization. In other words, the instantaneous range of change of the Fresnel transmittance as a function of angle of incidence at 10° is approximately zero. In contrast, an incident angle of 70° (point 820), corresponding to a relative sleek radome, shows significantly different Fresnel transmittance for angles ±10°. In other words, the instantaneous range of change of the Fresnel transmittance as a function of angle of incidence at 70° is significantly difference from zero, i.e., the Fresnel transmittance is rapidly changing as a function of angle of incidence. For an incident angle of 70°, radiation received within an angle of +10° (point 822, 45% transmittance) to −10° (point 824, 85% transmittance) shows a difference in Fresnel transmittance of 40% for S-polarization radiation.

Thus a sleek radome system benefiting from the Fresnel transmittance has a greater angular sensitivity than a blunt or hemispherical radome system. To benefit from the Fresnel transmittance, the incidence angle should be selected such that the Fresnel transmittance of the radiation varies significantly over the desired field of view, i.e., the slope of the Fresnel transmittance is significantly different from zero. The above example employed a field of view of ±10° and a fused silica-based material for the windows (not separately shown) of the optical channels 418, 421. Under these conditions, a minimum angle of incidence of at least approximately 60° is preferred, with at least approximately 70° being more preferred. The maximum incidence angle is approximately 80° when a ±10 degree field of view is required. Note that these minimum and maximum incidence angles are a function of the window material and the field of view.

Referring again to FIG. 8A, narrower fields of view will benefit from greater minimum angles to ensure that the Fresnel transmittance varies significantly over the desired field of view. Based upon Fresnel's equations, Eq. 1 and Eq. 2, different indices of refraction will change the shape of the Fresnel transmittance curve, and thus the minimum angle of incidence. For example, $Al_2O_3$ has a greater index of refraction than fused silica, and therefore would require a smaller minimum angle of incidence. One skilled in the art having the benefit of this disclosure will appreciate that these and other system parameters, including detector sensitivity, will determine how great the instantaneous rate of change of the Fresnel transmittance as a function of angle of incidence would need to be to achieve a required angle sensitivity.

Figure 8B:
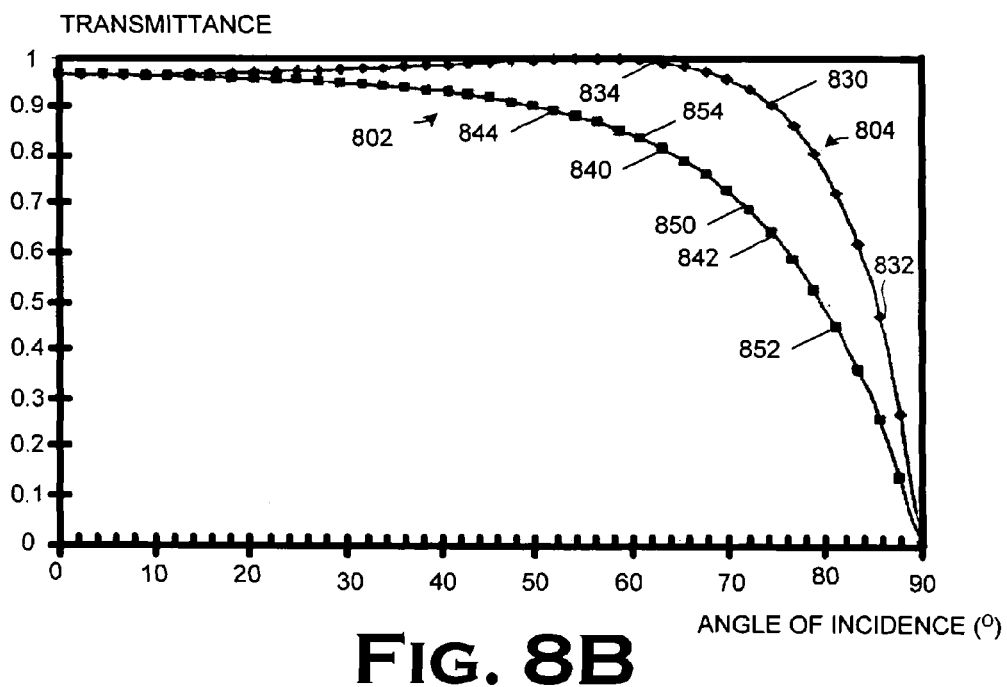

Specifying a middle field of view transmittance is an alternative is illustrated in FIG. 8B. For example, for a middle field of view Fresnel transmittance of 90% for P-polarized radiation (point 830), a ±10° field of view provides a change in Fresnel transmittance of is approximately 50% (points 832 and 834). A middle field of view Fresnel transmittance of 80% for S-polarized radiation (point 840) provides a change in Fresnel transmittance of approximately 25% (points 842 and 844) over the ±10° field of view. A middle field of view Fresnel transmittance of 70% would be preferable for the S-polarized radiation (point 850) as the ±10° field of view change in Fresnel transmittance increases to 40% (points 852 and 854). Because of this continuous or smooth variation in Fresnel transmittance as a function of incidence angle, even a single radiation detector can provide some indication of the angle of incidence if properly calibrated.

Thus, for the illustrated embodiment, the amplitude response of an incident light source follows this Fresnel curve for each of the forward and aft optical channels 418, 421. But all angles in the field of view 306, and thus a mix of amplitudes from each ground-cell 530 in view of the optical channel 418, 421, will be seen by optical channel 418, 421 simultaneously for a given sample. The illustrated embodiment relies on Doppler processing to break out each angular element, thus measuring angle by return signal frequency shift which is dependent on its angle. Correlating Doppler bins, e.g., the cells 530, with angle permits application of a Fresnel correction to each bin amplitude.

Figure 9A:
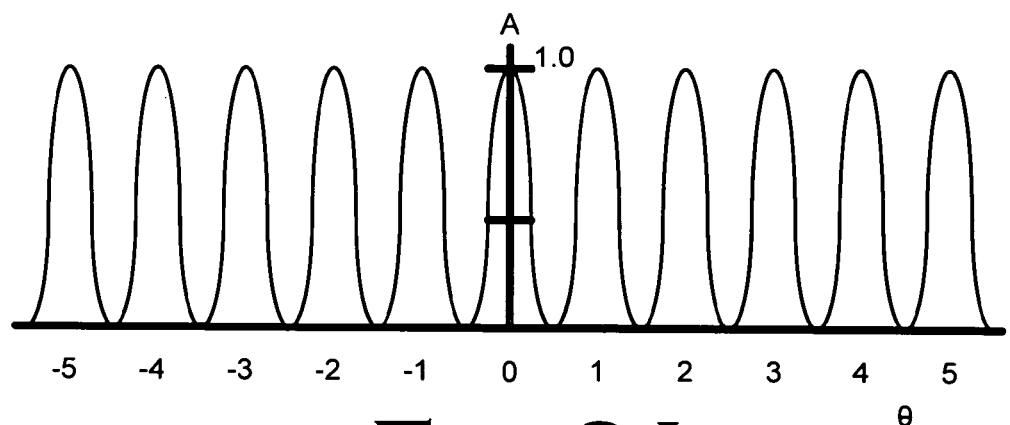
FIG. 9A-FIG. 9D graphically illustrate a Fresnel correction performed on detected instances of a reflection in the embodiment of FIG. 7.
Figure 9B:
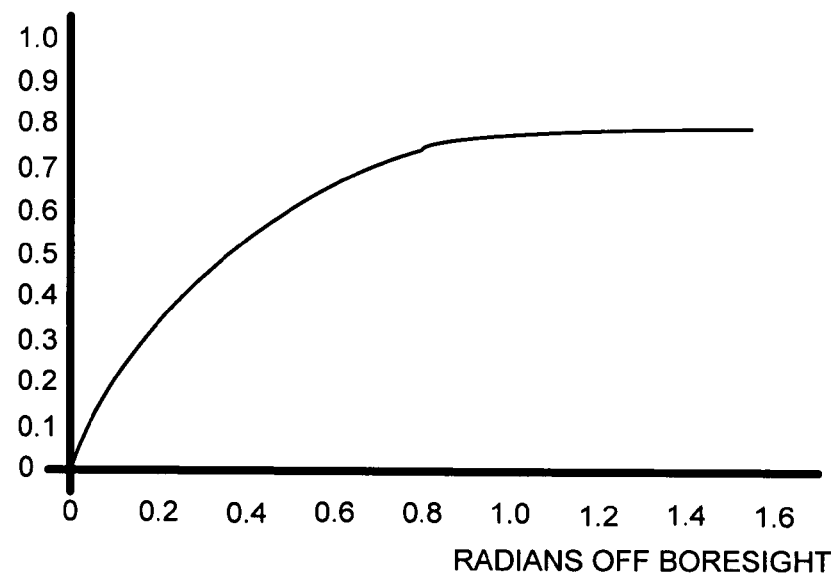
Figure 9C:
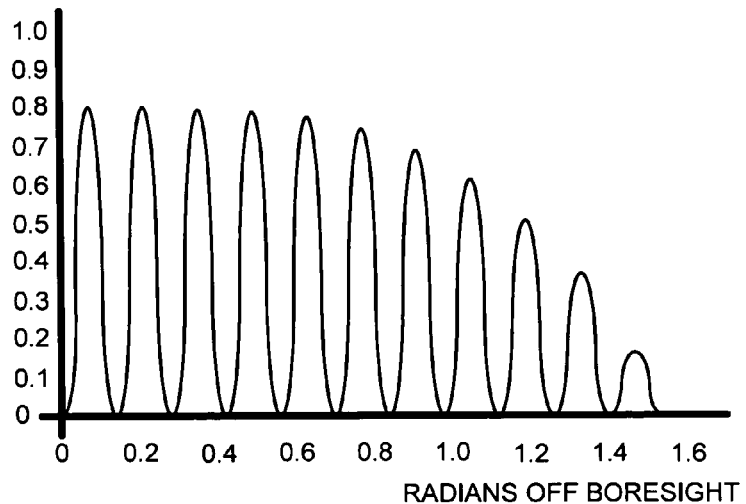

Returning to FIG. 7, the illustrated embodiment therefore first performs (at 705) Fresnel corrections on the first and second instances 507, 508. FIG. 9A-FIG. 9C illustrate this Fresnel correction for a representative instance of the reflection 506. FIG. 9A graphs the amplitude of an idealized reflection as a function of angle off the boresight 515, i.e., by cell. The reflection is idealized because each of the amplitudes is equal. As those in the art having the benefit of this disclosure will appreciate, the amplitudes will vary by the cell 530, depending on a number of well known factors. However, this idealized representation is used to more clearly illustrate the Fresnel affect discussed above. Note also that the amplitudes have been normalized for purposes of illustration.

Figure 9D:
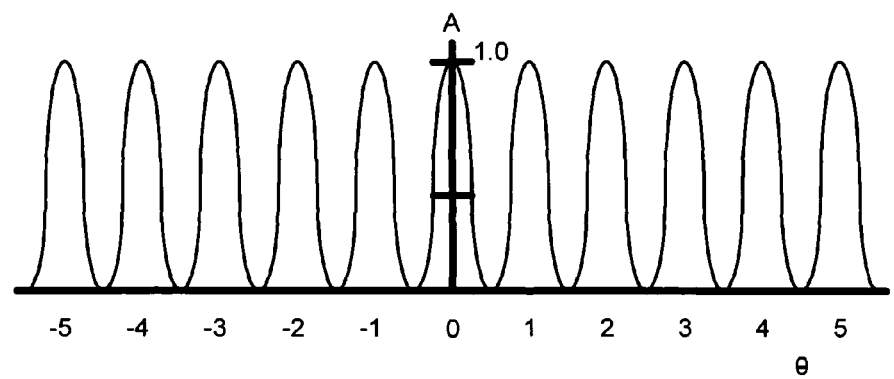

FIG. 9B illustrates a Fresnel curve such as the one in FIG. 8A, for a particular optical channel (e.g., the optical channels 418, 421). Note that the horizontal axis of the graph in FIG. 9B is measured in radians off the boresight 515, rather than by angle of incidence, as was the case for FIG. 5. FIG. 9C illustrates the signal detected from the reflection of FIG. 9A, as affected by the Fresnel effect discussed above. Note that the window of the optical channel modulates the return over the incident angle. However, because the angle of incidence is known from the rake of the radome 412, the Fresnel equations above can be applied to correct for the Fresnel effect and correct the amplitudes to their original level, as shown in FIG. 9D. Note that the angle of incidence is determined by and the Fresnel correction made to the Doppler bins as each one corresponds to an angle off boresight Once the Fresnel correction is performed (at 705, FIG. 7), the illustrated embodiment performs (at 710) a Doppler ambiguity correction on the Fresnel amplitude corrected first instance 507, shown in FIG. 5, utilizing the overlapping Fresnel amplitude corrected second instance 508. As previously mentioned, in the illustrated embodiment, the forward optical channel 418, shown in FIG. 4, sees past the boresight 515. The aft optical channel 421 can only see to the boresight 515. The region 518 where the fields of view 510, 512 of the forward and aft optical channels 418, 421, respectively, results in two sets of duplicate data. However, for the forward optical channel 418, azimuth cells 530 an equal distance on either side of boresight 515 also have an equal Doppler shift. Their amplitudes will, for that forward optical channel 418 only, be added to the same Doppler bin and cannot be separated without some further discrimination mechanism.

Figure 10A:
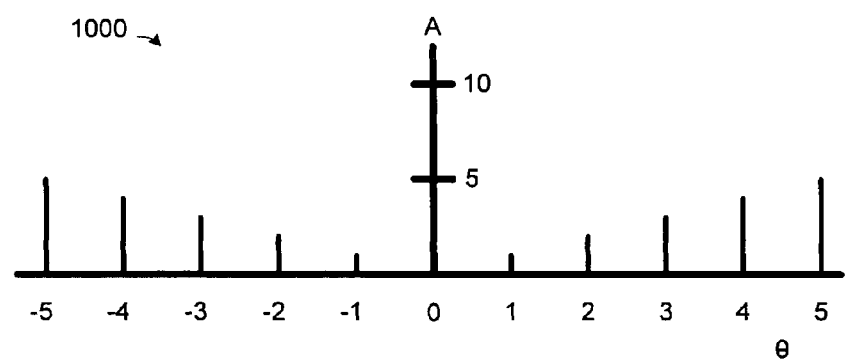
FIG. 10A-FIG. 10D illustrate a Doppler ambiguity correction performed on a Fresnel corrected, detected instance of a reflection in the particular embodiment of FIG. 7.
Figure 10B:
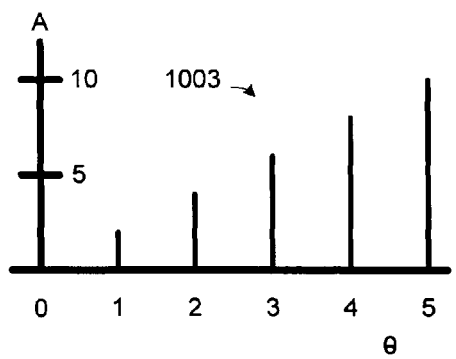
Figure 10C:
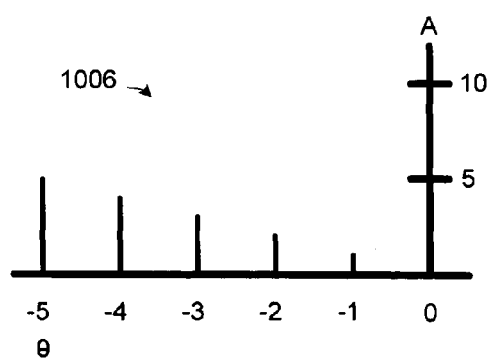

For purposes of illustration, assume that, like in FIG. 5, there are five point-like cells 530 on either side of the boresight 515—one for each azimuth resolution on both sides of boresight 515. Assume the first cells (±1 cell) closest to the boresight 515 have a magnitude of 1, the second (±2 cells) a magnitude of two, and so on. The received first instance 507 will look to the forward optical channel 418 as is shown in FIG. 10A. Note that cells 530 equidistant off the boresight 515 have the same Doppler shift, as discussed above. When the first instance 507 is detected by the forward optical channel 418, these cells 530 wind up in the same Doppler bin, and their amplitudes are added. Thus, what the forward optical channel 418 detects is shown in FIG. 10B, and to the forward detector an apparent cell 1 now has an amplitude of 2, apparent cell 2 has an amplitude of 4 and so on. However, the aft optical channel 421 detects only up to the boresight 515, and so suffers no such Doppler ambiguities when it receives the second instance 508. Thus, what the aft optical channel 421 detects is shown in FIG. 10C.

Consequently, the aft optical channel 421 measures what the forward optical channel 418 received from the cells 530 but without the cells 530 on the far side of the boresight 515. The output of the aft optical channel 421 can therefore be subtracted from the output of the forward optical channel 418 to recover what the forward optical channel 418 sees on the far side of the boresight 515 with the near side removed. Note that the illustrated embodiment performs the Fresnel correction before the Doppler ambiguity correction. Otherwise, the subtraction process would err because Doppler bins take up different locations beneath the Fresnel curve for each optical channel 418, 421 due to their relative difference in tilt angle to the boresight 515 imposed by the shape of the radome 412. The illustrated embodiment then uses the aft optical channel 421 output for those cells 530 that overlap, replacing the forward optical channel 418 for that region 518.

Figure 10D:
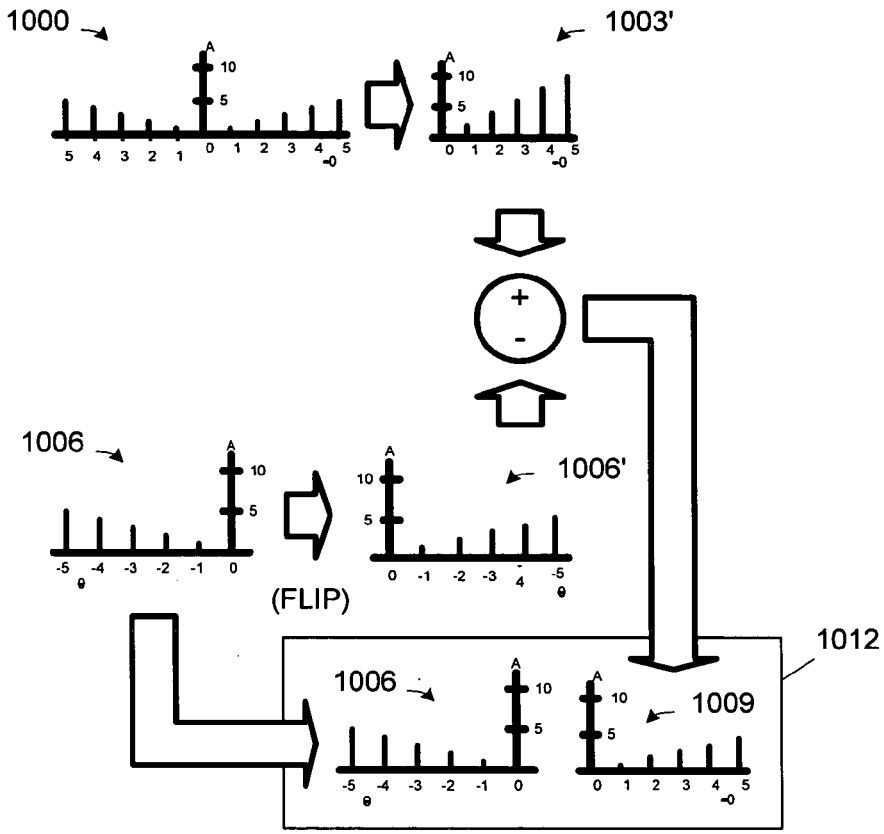

FIG. 10D is a visualization of what takes place in this second subtraction process. The first instance 507, as received, is shown as the graph 1000, first shown in FIG. 10A. The detected, Fresnel corrected returns from the cells 530 on the far side of the boresight 515 (+1 to +5 cells) are shown in the graph 1003'. The detected, Fresnel corrected returns from the cells 530 on the near side of the boresight 515 (−1 to −5 cells) are shown as the graph 1006, first shown in FIG. 10C. The one is subtracted from the other as described above, to obtain the Doppler ambiguity corrected signal, represented in the graph 1009. Note that the reversal of the information from the aft optical channel 421, represented by the graph 1006', is only a visualization device employed in light of the assumption above that each azimuth cell 530 is in reference to the boresight 515. The difference, represented by the graph 1009, is then combined with the detected, Fresnel corrected returns from the cells 530 on the near side of the boresight 515 (−1 to −5 cells), represented by the graph 1006, to arrive at the Doppler ambiguity corrected returns 1012.

Figure 2:
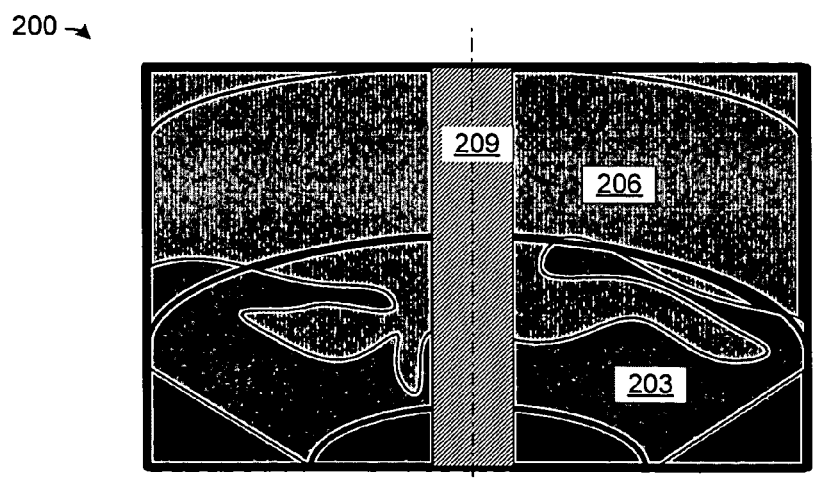
FIG. 2 depicts a conceptualized RADAR display including a blind zone such as is generated by conventional Doppler beam sharpening system.

Note that the Doppler ambiguity corrected returns 1012 include data for the cells 530 immediately adjacent (±1 cell) the boresight 515. In conventional systems, these cells would include the DBS blind zone, such as the DBS blind zone 209 in FIG. 2. However, the present invention eliminates the DBS blind zone and permits resolution of the content of the cells 530 right up to the boresight 515. Thus, the content of all the cells 530 in the field of view 306 may be resolved without any blind zone.

Figure 11A:
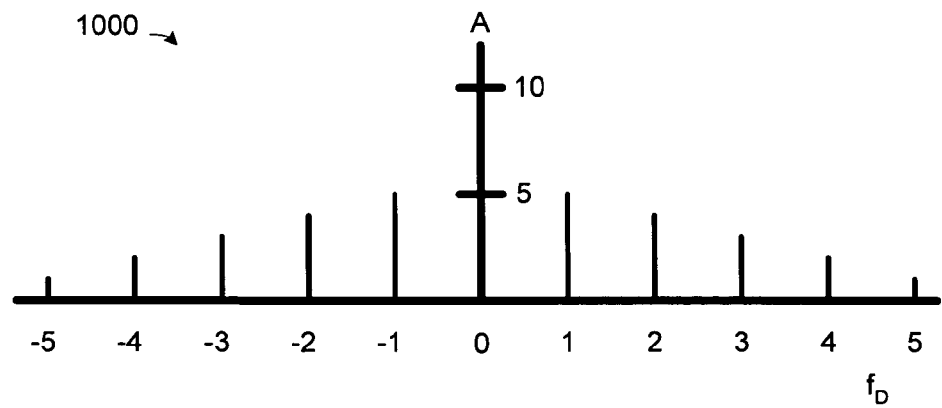
FIG. 11A-FIG. 11B illustrate the Doppler ambiguity correction of FIG. 10A-FIG. 10D performed in the frequency domain.
Figure 11B:
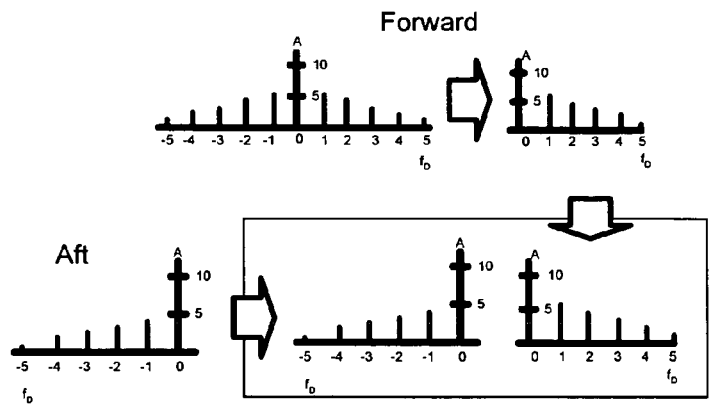

Note that the Doppler ambiguity correction may alternatively be visualized in the frequency domain. In practice, both the forward optical channel 418 and the aft optical channel 421 will measure the same Doppler frequencies for cells 530 common to their respective fields of view 510, 512. Those cells 530 closest to boresight 515 (i.e., ±1 cell off the boresight 515) will reside in the maximum Doppler bins while those farther from it will be in lower velocity bins. Maintaining the same cell radar cross section ("RCS") magnitudes used above then the appearance of the bin magnitudes are reversed for the forward window when the x-axis is by Doppler not look angle, like as shown in FIG. 11A. With Doppler, not angle as the x-axis reference, the Doppler ambiguity correction would be as shown in FIG. 11B.

Note that the invention admits wide variation in implementation. For instance, due to the nature of optics, the field of view 512 for the aft optical channel 421 will not cut off at the boresight 515 without a steady decrease in aperture and thus power received. Thus, specific to the optics design, an additional amplitude adjustment factor may be desirable to properly recover ground-cell magnitudes in some embodiments. Furthermore, the outer surface of the window (not separately shown) of the aft optical channel 412 may be parallel to the axis of the platform 303 in which case there is a sharp boresight cutoff. However, strong losses due to majority reflection for such high incident angles for those ground-cells 530 slightly off the boresight 515 results in great signal loss. It may be that the aft window faces boresight at some angle from the axis of the platform 300 to reduce these losses but is baffled to cut off at the boresight 515. There may also be operational modes which truly fill the blind zone by commencement of processing in that region as a function of seeker-to-target approach if indeed insufficient power is received at distance.

Thus, at laser wavelengths a pair of detectors fore and aft can be used to fill the typical DBS blind zone in the direction of motion through overlapping fields of view, implementing an amplitude correaction over angle process, a Doppler correlation and amplitude correction process in a region of overlapping detector fields of view and assigning maximum Doppler returns to those cells on boresight.

Figure 12C:
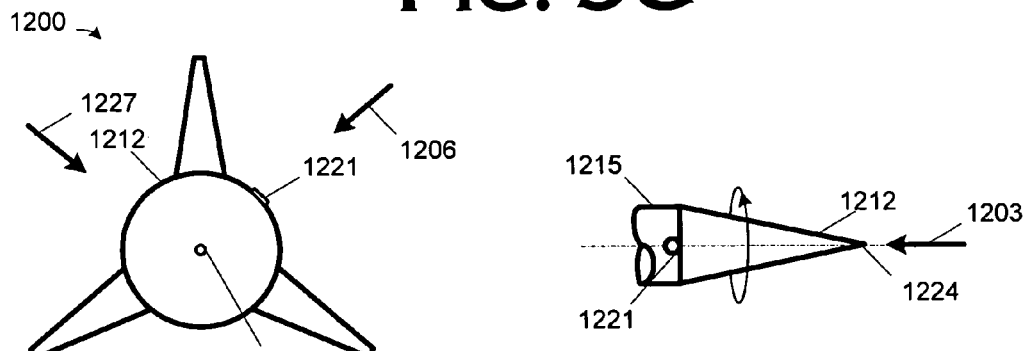
Figure 12C:
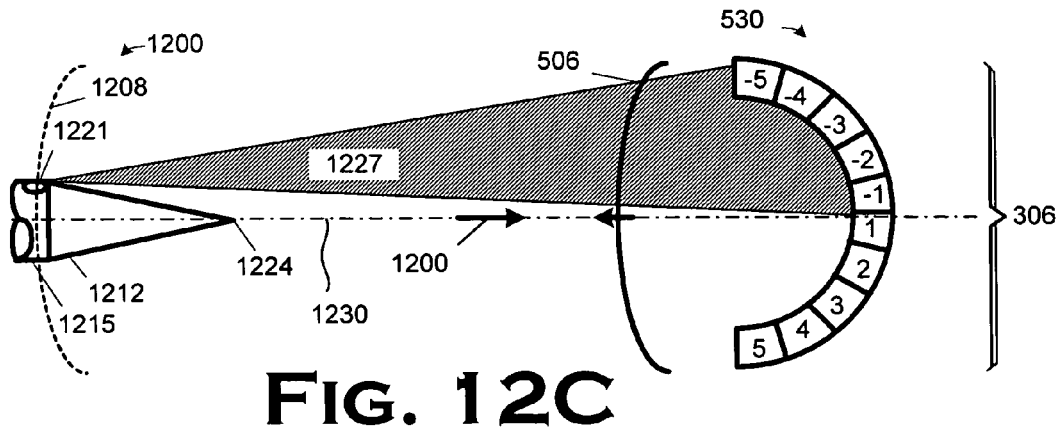

Note there remains an option to use a single aft window with cutoff field of view near boresight, as described above, but without a forward detector companion. One such embodiment is shown in FIG. 12A-FIG. 12C. More particularly, FIG. 12A-FIG. 12B depict an alternative embodiment 1200 of the forward end 321 of the platform 303, first shown in FIG. 3. FIG. 12A is a plan, head-on view of the embodiment 1200 from the perspective of the arrow 1203 in FIG. 12B. FIG. 12B is a plan, side view of the embodiment 1200 from the perspective of the arrow 1206 in FIG. 12A.

The embodiment 1200 includes a radome 1212 affixed to the fuselage 1215 of the platform 303. The embodiment 1200 includes only a single optical channel 1221 through which it receives the reflected signal 506. The optical channel 1218 is situated on the fuselage 1215. For the sake of illustration, the optical channel 1221 is shown in FIG. 12B as elevating slightly from the surface of the fuselage 1215. The embodiment 1200 also includes an aperture 1224 through which an on-board signal generator (not shown) may transmit the optical signal. Note that the field of view 1227, shown in FIG. 12C, for the optical channel 1221 is limited, by virtue of its position, to the near side of the field of view 306 for the platform 303. That is, it is bound by the boresight 1230.

Note that this particular embodiment does not acquire data from the far side of the boresight 1230. This particular embodiment therefore cannot resolve the content of the DBS blind zone on the far side of the boresight 1230. However, at optical wavelengths, the boresight 1230 can be approached with the one optical channel 1221 due to the ability to resolve narrow Doppler differences that may be discriminated at optical wavelengths. Nevertheless, in this particular embodiment, no multiple amplitude corrections are required even though, without information from the far side, there would be only one side of the forward field of view 306 available to image.

Thus, referring to FIG. 12C and FIG. 13, the present invention, in one aspect, includes a method 1300, shown in FIG. 13, for remotely sensing the content in a field of view 306, shown in FIG. 12C, that resolves the content of a plurality of cells 530 in the field of view 306. The method 1300 comprises:

transmitting (at 1303) a coherent optical signal 1200 into the field of view 306 from a platform 303;

receiving (at 1306) a first instance 1208 of a reflection 506 of the optical signal 1200 from a portion 1227 of the field of view 306 bounded by the platform's boresight 1230;

detecting (at 1309) the reflection 506 in the first instance 1208;

correcting (at 1312) the first instance 1208 of the detected reflection 506; and resolving (at 1315) the content of a plurality of cells 530 in the field of view 306 up to the platform's boresight 1230 from the corrected first instance 1208 of the reflection 506.

Correcting (at 1312) the first instance 1208 of the detected reflection 506, however, differs from the embodiment discussed above relative to FIG. 4A-FIG. 4B and FIG. 5-FIG. 6.

In this particular embodiment, correcting (at 1312) the first instance 1208 of the detected reflection 506 includes only performing a Fresnel correction on the first instance 507, as was previously discussed. Note that, although there will be no Doppler ambiguity, the Fresnel correction is still performed to mitigate amplitude modulation arising from glass signal rejection, which will vary with angle. This embodiment omits performing a Doppler ambiguity correction because there are none in the data acquired by this embodiment because the data is acquired only on one side of the boresight 1230. There consequently is no need to distinguish between cells 530 on opposite sides and equidistant from the boresight 1230. Furthermore, at optical wavelengths, the boresight 1230 can be approached with only the one optical channel 1321 due to the ability to resolve narrow Doppler differences.

Alternatively, if both sides of the radome have optical channels that are bound by the boresight, a full field of view image can be made without correction for Doppler ambiguities. FIG. 14A-FIG. 14C illustrate one such embodiment 1400. FIG. 14A is a plan, head-on view from the perspective of the arrow 1402 in FIG. 14B and FIG. 14B is a plan, side view from the perspective of the arrow 1404 in FIG. 14A. Two optical channels 1406, 1408 are situated on either side of the radome 1410, and their respective fields of view 1412, 1414 are restricted to one side of the boresight 1416. Note that the fields of view 1412, 1414 do not overlap, and so do not present Doppler ambiguities. Furthermore, the optical signal 1418 is of a wavelength that will permit resolution of narrow Doppler differences, i.e., up to the boresight 1416. But, unless a field of view cutoff is used on a forward optic during imaging and removed during other operations this two-sided-window non-Doppler corrected method requires three independent Doppler channels as one more is needed for Doppler tracking optical monopulse implemented on a window covering the entire field of view.

Note that in each of the above embodiments at least one field of view for the optical channel(s) is bound by the boresight to prevent or facilitate correaction of Doppler ambiguities. As is alluded to above, this binding to the boresight may be accomplished in at least two ways. First, the field of view for a given optical channel may be bound by positioning the window for the optical channel at a point on the radome or fuselage so that the field of view cannot reach past the boresight. Second, the window for the optical channel can be baffled to prevent reception and detection of returns from the far side of the boresight. For instance, in the embodiment 1500 of FIG. 15A-FIG. 15B, both the forward and aft optical channels 1502, 1504 are situated on the radome 1506. Thus, the aft optical channel 1504 is baffled to bind its field of view to the boresight 1508. Baffling techniques are known to the art, and any suitable baffling technique may be employed.

Note also that, where multiple optical channels are employed, they may be longitudinally aligned or unaligned to satisfy filter bandwidth at those angles, or match antenna scan rate to satisfy fixed Doppler filter bandwidths. In the embodiment 400 of FIG. 4A-FIG. 4B, optical channels 418, 421 are fully, longitudinally aligned. In the embodiment 1400, in FIG. 14A-FIG. 14B, the optical channels 1406, 1408 are fully unaligned, i.e., spaced 180° about the radome 1410. However, embodiments may fall in the range defined by these extremes provided the fields of view for the optical channels are appropriately controlled so that Doppler ambiguities are either prevented or can be corrected.

The present invention is a non-scanning application contrary to some conventional forms of DBS that scan back and forth over the boresight. In those conventional applications, the aperture time must change with look angle to satisfy filter bandwidths at those angles. The present invention uses the longest aperture time required to satisfy the narrowest filter widths near boresight. While not tied to scanning rate, aperture time is still satisfied in processing. The result of long aperture times on filters sensing broadside cells further from the boresight is to effectively resolve multiple cells in those wider filters. Those cells can be averaged or threshold detected to return amplitudes for each cell. The filter widths can be made dynamic, as is known in the art. With reduced range due to approach of a cell (or a target), the cell grows in angle and thus becomes wider in filter width. This means the $\Delta f$ may be expanded at smaller and smaller look angles as the platform nears a target or maintain $\Delta f$, creating more resolution on the target for potential identification. Finally, to address narrow cells directly on boresight, maximum Doppler returns over each range gate may be used from which amplitudes will determine cell gray scale. The maximum Dopplers are those on a line directly ahead of boresight.

Figure 16:
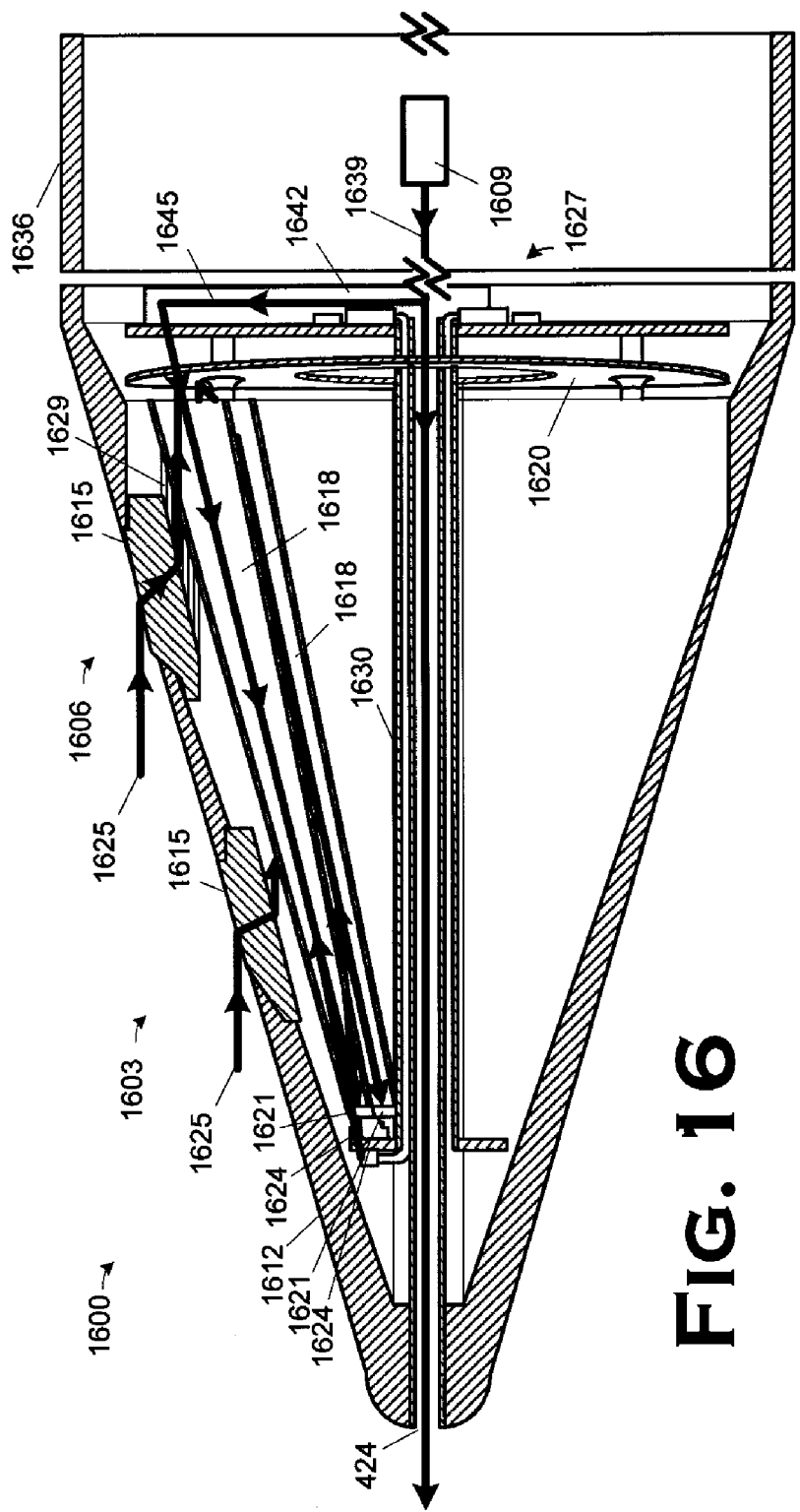
FIG. 16 depicts, in a partially sectioned view, one particular implementation of the optical channels of an apparatus in accordance with the present invention.

FIG. 16 depicts one particular implementation 1600 of the forward end 321 of the platform 303 in FIG. 1 in a partially sectioned, side view. FIG. 16 illustrates the construction and operation of exemplary forward and aft optical channels 1603, 1606 as well as the optical source 1609. The implementation 1600 comprises a radome 1612, in which the plurality of optical channels 1603, 1606 is situated. Note that the optical channels 1603, 1606 are longitudinally aligned on the radome 1612.

Each of the optical channels 1603, 1606 includes a window 1615. The windows 1609 are fabricated from a material that transmits the incident radiation, typically a laser pulse, but can also withstand applicable environmental conditions. In the illustrated embodiment, one important environmental condition is aerodynamic heating due to the velocity of the platform 303. Another important environmental condition for the illustrated embodiment is abrasion, such as that caused by dust or sand impacting the windows 1609 at a high velocity. Thus, for the illustrated embodiment, fused silica is a suitable material for the windows 1609. Alternative embodiments may employ ZnSe, $Al_2O_3$, and Ge.

However, depending upon a number of factors, including shape of the radome 1612, strength of the window materials, manufacturability, and cost, it may be preferable implement the windows 1609 collectively as a collar 1700, shown in FIG. 17A-FIG. 17B, extending around the perimeter of the radome 1612. Thus, the windows 1609 comprise a windowing system that, in alternative embodiments, may be implemented in a collar. In addition, while the windows 1609 have a constant thickness, the thickness may vary in some embodiments, e.g., the window thickness may vary linearly.

Returning to FIG. 16, each of the optical channels 1603, 1606 further includes a light pipe 1618, a reflector 1620, a bandpass filter 1621, and a detector 1624. The light pipe 1618 acts as a waveguide to direct the radiation transmitted through the windows 1609 to the detectors 1624 via the reflector 1620 and through the bandpass filters 1621, as represented by the arrows 1625. The bandpass filters 1621 are optional, and help to limit the radiation bandwidth of each channel to limit noise in the data. In the illustrated embodiment, the detectors 1624 comprise photodetectors such as are well known in the art.

The detectors 1624 are comprised of materials suited to the particular application. For a particular application where high speed, wide bandwidth detectors are required for proper reception of narrow pulses, small, low capacitance InGaAs detectors may be used vs. low speed PIN detectors. Low noise, long range detection may employ avalanche detectors. Detector material type, size and electrical characteristics common in the art will be dependent on the specific application.

With respect to the radiation detectors 1624, they should be mechanically robust to withstand vibrations and stresses encountered during launch and operation of the platform 303. The radiation detectors 1624 absorb the received radiation and, thus, selection of the radiation detector 1624 depends upon the wavelength of the received radiation. Furthermore, it may be desirable for the radiation detectors 1624 to respond to very short durations of the received radiation. Photodetectors comprised of semiconductor material typically meet these requirements and thus are the preferred radiation detectors 1624.

While the description to this point has assumed a single element in each photodetector 1624, this is not required. If each photodetector 1624 actually comprises two or more individual detector elements (not shown), additional noise reduction is possible. For example, by summing the signals from each individual detector element, the noise in the signal from one detector element will partially cancel the noise in the signal from another detector element. When two or more individual detector elements form each photodetector 1624, it is preferable to focus the radiation across all of the individual detector elements such that each is approximately equally illuminated by the radiation.

The bandpass filter 1621, placed in front of the radiation detector 1624, blocks a portion of the radiation incident thereon. The bandpass filter 1621 is preferably a bandpass filter. The method of constructing such a bandpass filter is well known in the art and thus a discussion of the design and construction of a bandpass filter is omitted here. The bandpass filter would transmit radiation within a given wavelength range, while blocking substantially all other radiation. By designing the bandpass filter to transmit radiation of the same wavelength used in the received radiation, the bandpass filter 1621 would block radiation pulses of different wavelengths, perhaps resulting from countermeasures and/or background radiation.

The aft optical channel 1606 is situated on the radome 1612. It therefore includes a baffle 1629 to bind its field of view to the boresight 1630. The light baffle 1629 forms a series of coaxial hollow cylinders that only transmit received energy incident at certain angles. By employing the light baffle 1629, stray energy can be absorbed by the light baffle 1629 prior to being absorbed by the radiation detectors 1624. Light tubes (not shown) are an acceptable alternative to the light baffle 1629. A light tube, much like a soda straw, would only transmit a radiation pulse that is nearly parallel to the axis of the light tube. Other energy not nearly parallel to the axis of the light tube would be blocked and absorbed, much as with the light baffle 1629.

Still referring to FIG. 16, the detectors 1624 are electrically connected through a wiring harness 1630 to a plurality of electronics 1627 that capture, store, and process the information output by the detectors 1624. In the illustrated embodiment, the detectors 1624 convert the analog radiation received through the optical channels 1603, 1606 into digital data. The platform 303 also includes an optical light source 1709, housed in the fuselage 1636. Note that, in some embodiments, the optical light source 1709 may be housed in the radome 1612. In the illustrated embodiment, the optical light source is a laser, such as are well known and commonly used in the LADAR arts. The optical light source 1709 generates a signal 1639 that is transmitted from the platform 303 out the aperture 424 though some optics 1642. The optics 1642 split the signal 1639, and a portion 1645 is transmitted through one of the optical channels 1603, 1606 to the at least one of the photodetectors 1624. The electronics 1627 can then use the portion 1645 to determine the Doppler shift between the original signal 1639 and the returns 1625.

Figure 18:
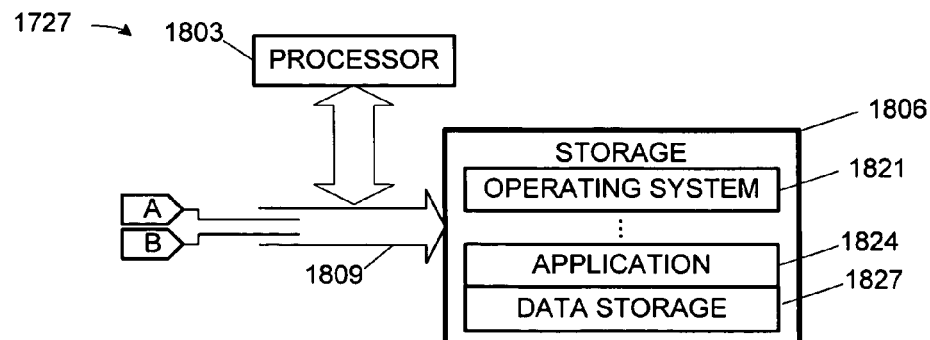
FIG. 18 depicts, in a block diagram, selected portions of the electronics of the implementation of FIG. 16.

FIG. 18 depicts, in a conceptualized block diagram, selected portions of the electronics 1627 with which certain aspects of the present invention may be implemented. The electronics 1627 include a processor 1803 communicating with some storage 1806 over a bus system 1809. In general, the electronics 1627 will handle lots of data in relatively short time frames. Thus, some kinds of processors are more desirable than others for implementing the processor 1805 than others. For instance, a digital signal processor ("DSP") may be more desirable for the illustrated embodiment than will be a general purpose microprocessor. In some embodiments, the processor 1803 may be implemented as a processor set, such as a microprocessor with a math co-processor.

The storage 1806 may be implemented in conventional fashion and may include a variety of types of storage, such as a hard disk and/or random access memory ("RAM") and/or removable storage such as a magnetic disk (not shown) or an optical disk (also not shown). The storage 1806 will typically involve both read-only and writable memory. The storage 1806 will typically be implemented in magnetic media (e.g., magnetic tape or magnetic disk), although other types of media may be employed in some embodiments (e.g., optical disk). The present invention admits wide latitude in implementation of the storage 1806 in various embodiments. In the illustrated embodiment, the storage 1806 is implemented in RAM and in cache.

The storage 1806 is encoded with an operating system 1821. The processor 1803 runs under the control of the operating system 1821, which may be practically any operating system known to the art. The storage 1806 is also encoded with an application 1842 in accordance with the present invention. The application 1824 is invoked by the processor 1803 under the control of the operating system 1821. The application 1824, when executed by the processor 1803, performs the process of the invention described more fully above. The storage 1806 includes a data storage 1827 comprising a data structure that may be any suitable data structure known to the art.

The inputs A-B in FIG. 18 represent the digital output of the detectors 1621 for the optical channels 1603, 1606. The data received from the inputs A-B is stored in the data storage 1827. The application 1824, when invoked, performs the methods described above, depending on the embodiment being implemented, to resolve the content of, e.g., a plurality of cells 530, shown in FIG. 5. Note that this operation comprises the execution of the application, and is therefore software implemented. As those in the art having the benefit of this disclosure will appreciate, such a functionality may be implemented in hardware, software, or some combination of the two, depending on the implementation. In the illustrated embodiment, the functionality is implemented in software.

Consequently, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for remotely sensing the content in a field of view, the method comprising:
   transmitting a coherent optical signal into the field of view from a platform;
   receiving a first instance of a reflection of the optical signal from a portion of the field of view bounded by the platform's boresight;
   detecting the reflection in the first instance;
   correcting the first instance of the detected reflection; and
   resolving the content of a plurality of cells in the field of view up to the platform's boresight from the corrected first instance of the reflection.

2. The method of claim 1, wherein transmitting the coherent optical signal includes transmitting a coherent signal in one of the visible, ultraviolet, near infrared, medium-wave infrared, and long-wave infrared bands.

3. The method of claim 1, further comprising:
   receiving a second instance of the reflection from a second portion of the field of view, wherein the first and second portions are not co-extensive on both sides of the boresight;
   detecting the reflection in the second instance; and
   correcting the detected second instance of the reflection.

4. The method of claim 3, wherein the second portion is bounded by the boresight.

5. The method of claim 4, wherein detecting the second instance includes baffling the detection to bind the second portion by the boresight.

6. The method of claim 3, wherein the second portion overlaps the first portion and correcting the first instance includes performing a Doppler ambiguity correction on the first instance utilizing the overlapping second instance.

7. The method of claim 3, wherein the first and second portions of the field of view are mutually exclusive.

8. The method of claim 3, wherein resolving the content includes imaging the content.

9. The method of claim 1, wherein correcting the detected first instance of the reflection includes performing a Fresnel correction, filtering noise, or both performing a Fresnel correction and filtering noise.

10. The method of claim 1, further comprising guiding the platform to a target responsive to the resolution of the cells.

11. The method of claim 1, wherein the boresight is co-aligned with a direction of motion for the platform.

12. A method for remotely sensing the content in a field of view, the method comprising:
    transmitting a coherent optical signal into the field of view from a platform;
    receiving a first instance of a reflection of the optical signal from a first portion of the field of view, the first portion extending on both sides of the platform's boresight;
    receiving a second instance of the reflection of the optical signal on the same side of the boresight as the first instance, the second instance covering a second portion of the field of view overlapping the first portion and bounded by the platform's boresight;
    detecting the reflection in the first and second instances:
    performing Fresnel corrections on the first and second instances; and
    performing a Doppler ambiguity correction on the Fresnel amplitude corrected first instance utilizing the overlapping Fresnel amplitude corrected second instance.

13. The method of claim 12, wherein transmitting the coherent optical signal includes transmitting a coherent signal in one of the visible, ultraviolet, near infrared, medium-wave infrared, and long-wave infrared bands.

14. The method of claim 12, wherein detecting the second received instance includes baffling the detection to bind the second portion by the boresight.

15. A method for remotely sensing the content in a field of view, the method comprising:
    transmitting a coherent optical signal into the field of view from a platform;
    receiving at least a first instance of a reflection of the optical signal from a first portion of the field of view; and
    detecting the reflection in the first instance;
    resolving the content of a plurality of cells in the Doppler beam sharpening blind zone in the field of view from the at least first instance of the reflection.

16. The method of claim 15, wherein transmitting the coherent optical signal includes transmitting a coherent signal in one of the visible, ultraviolet, near infrared, medium-wave infrared, and long-wave infrared bands.

17. The method of claim 15, further comprising:
    receiving a second instance of the reflection from a second portion of the field of view, wherein the first and second portions are not co-extensive on both sides of the boresight; and
    correcting the detected second instance of the reflection.

18. The method of claim 15, further comprising correcting the detected first instance of the reflection.

19. The method of claim 15, further comprising guiding the platform to a target responsive to the resolution of the cells.

20. The method of claim 15, wherein the boresight is co-aligned with a direction of motion for the platform.

21. An apparatus, comprising:
a radome;
an optical signal generator that, in operation, generates an optical signal;
an optical transmission channel for the optical signal through the radome, the optical transmission channel defining a boresight for the apparatus;
an optical receiver channel through which a first instance of a reflection of the optical signal may be received, the sensed portion of the field of view for the optical receiver channel being bound by the boresight and outputting a signal representative of the first instance of the reflection; and
a plurality of electronics that, in operation, receives the representative signal and:
correcting the first instance of the detected reflection; and
resolving the content of a plurality of cells in the field of view up to the boresight from the corrected first instance of the reflection.

22. The apparatus of claim 21, wherein the radome is raked.

23. The apparatus of claim 21, wherein the optical signal generator, in operation, generates the optical signal in one of the visible, ultraviolet, near infrared, medium-wave infrared, and long-wave infrared bands.

24. The apparatus of claim 23, wherein the optical signal generator comprises includes a laser.

25. The apparatus of claim 21, wherein the optical signal generator comprises includes a laser.

26. The apparatus of claim 21, wherein the optical signal generator is housed in the radome.

27. The apparatus of claim 21, wherein the optical receiver channel comprises a direct optical channel.

28. The apparatus of claim 27, wherein the direct optical receiver channel includes:
a window in the radome;
a photodetector that, in operation, detects the first instance of the reflection received through the window and generating the representative signal; and
a light tube between the window and the photodetector through which the reflection propagates to the photodetector.

29. The apparatus of claim 21, wherein the optical receiver channel includes:
a window in the radome;
a photodetector that, in operation, detects the first instance of the reflection received through the window and generating the representative signal; and
a light tube between the window and the photodetector through which the reflection propagates to the photodetector.

30. The apparatus of claim 29, wherein the window comprises one of a dedicated window and a portion of a collar.

31. The apparatus of claim 21, wherein the optical receiver channel comprises an indirect optical channel.

32. The apparatus of claim 31, wherein the indirect optical channel comprises:
a window in the radome;
a photodetector that, in operation, detects the first instance of the reflection and generating the representative signal;
a mirror reflecting the first instance of the reflection received through the window to the photodetector; and
a light tube between the window and the photodetector through which the first instance of the reflection propagates from the mirror to the photodetector.

33. The apparatus of claim 21, wherein the optical channel comprises:
a window in the radome;
a photodetector that, in operation, detects the first instance of the reflection and generating the representative signal;
a mirror reflecting the first instance of the reflection received through the window to the photodetector; and
a light tube between the window and the photodetector through which the first instance of the reflection propagates from the mirror to the photodetector.

34. The apparatus of claim 33, wherein the window comprises one of a dedicated window and a portion of a collar.

35. The apparatus of claim 21, wherein the electronics include:
a processor;
a storage encoded with:
a data structure in which data from the representative signal is stored; and
an application that, when invoked by the processor, performs the correction and resolution on the data.

36. An apparatus, comprising:
a radome;
an optical signal generator that, in operation, generates an optical signal;
an optical transmission channel for the optical signal through the radome, the optical transmission channel defining a boresight for the apparatus;
a first optical receiver channel through which a first instance of a reflection of the optical signal may be received, the first sensed portion of the field of view for the first optical receiver channel extending on both sides of the platform's boresight;
a second optical receiver channel through which a second instance of the reflection may be received, the second sensed portion of the field of view for the second optical receiver channel overlapping the first portion and bounded by the platform's boresight; and
a plurality of electronics that, in operation:
performs Fresnel corrections on the first and second instances; and
performs a Doppler ambiguity correction on the Fresnel amplitude corrected first instance utilizing the overlapping Fresnel amplitude corrected second instance.

37. The apparatus of claim 36, wherein the radome is raked.

38. The apparatus of claim 36, wherein the optical signal generator, in operation, generates the optical signal in one of the visible, ultraviolet, near infrared, medium-wave infrared, and long-wave infrared bands.

39. The apparatus of claim 36, wherein the first optical receiver channel, the second optical receiver channel, or both the first and second optical receiver channels comprises a direct optical channel.

40. The apparatus of claim 36, wherein the optical receiver channel includes:
a window in the radome;
a photodetector that, in operation, detects the first instance of the reflection received through the window and generating the representative signal; and
a light tube between the window and the photodetector through which the reflection propagates to the photodetector.

41. The apparatus of claim 36, wherein the optical receiver channel comprises an indirect optical channel.

42. The apparatus of claim 36, wherein the optical channel comprises:
- a window in the radome;
- a photodetector that, in operation, detects the first instance of the reflection and generating the representative signal;
- a mirror reflecting the first instance of the reflection received through the window to the photodetector; and
- a light tube between the window and the photodetector through which the first instance of the reflection propagates from the mirror to the photodetector.

43. The apparatus of claim 36, wherein the electronics include:
- a processor;
- a storage on which resides:
  - a data structure in which data from the representative signal is stored; and
  - an application that, when invoked by the processor, performs the correction and resolution on the data.

* * * * *